United States Patent [19]
Da Vault

[11] Patent Number: 5,007,568
[45] Date of Patent: Apr. 16, 1991

[54] TRUCK SIDEWALL MOUNTED CHAIN SAW CARRIER

[76] Inventor: Jimmy C. Da Vault, P.O. Box 78, Colburn, Id. 83865

[21] Appl. No.: 475,681

[22] Filed: Feb. 6, 1990

[51] Int. Cl.$^5$ .............................................. F16M 1/00
[52] U.S. Cl. .............................. 224/42.45 R; 224/315; 224/321; 224/324; 224/328; 296/37.6; 30/296.1; 211/4; 211/60.1; 211/70.7; 248/552; 248/503
[58] Field of Search ................ 224/42.45 R, 311, 315, 224/321, 324, 325, 326, 328; 30/381, 298.4, 296.1; 211/4, 60.1, 70.1, 70.6, 70.7; 248/37.6, 314, 503, 552; 296/4, 37.6

[56] References Cited
U.S. PATENT DOCUMENTS

| | | | |
|---|---|---|---|
| 4,473,176 | 9/1984 | Harper | 224/42.45 R |
| 4,846,385 | 7/1989 | Fratus | 224/42.25 R |
| 4,907,778 | 3/1990 | Rockwell | 248/676 |

Primary Examiner—Ernest G. Cusick
Attorney, Agent, or Firm—Wells, St. John & Roberts

[57] ABSTRACT

A chain saw carrier mounts to the upright sidewalls of a truck and includes an angularly adjustable frame for carrying one or more saws above the bed of the truck. The carrier includes a frame suspended over the truck bed. A slotted blade receiver plate receives the saw blades, and a saw dog receiving bar above the plate secures and supports the saws by engagement between adjacent saw dog points on the engine compartments. The weight of the saws bear against the saw dog receiving bar which holds the saws elevationally in position. The carrier may include a cover member, selectively securable over the saw engine compartments. A locking device employs a flexible locking member that may be secured through the handle enclosures of saws mounted to the device, to secure the saw or saws to the carrier frame. The preferred carrier also includes a number of lockable tool compartments for receiving accessories, as well as hooks for suspending items such as tool belts.

28 Claims, 4 Drawing Sheets

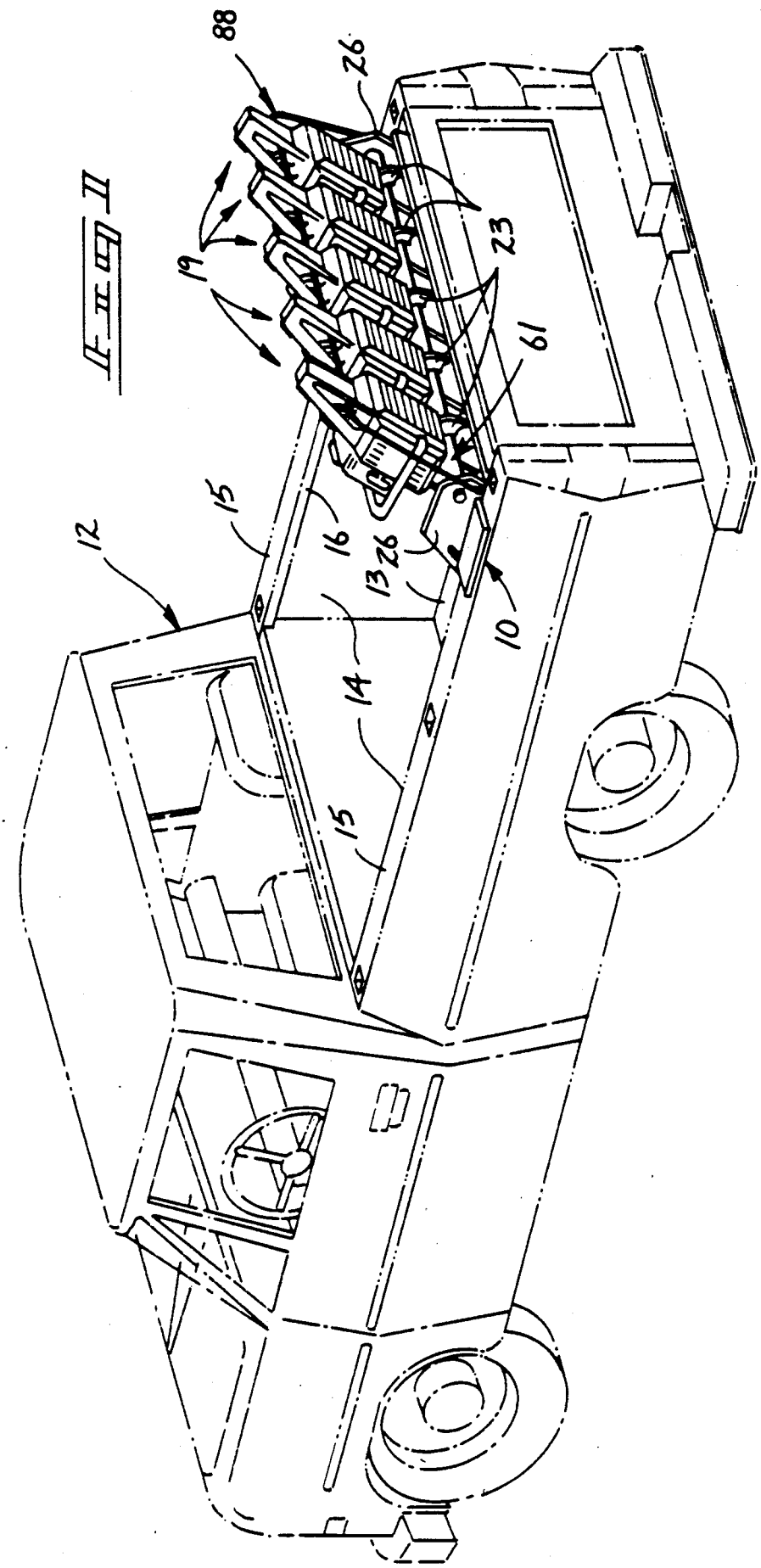

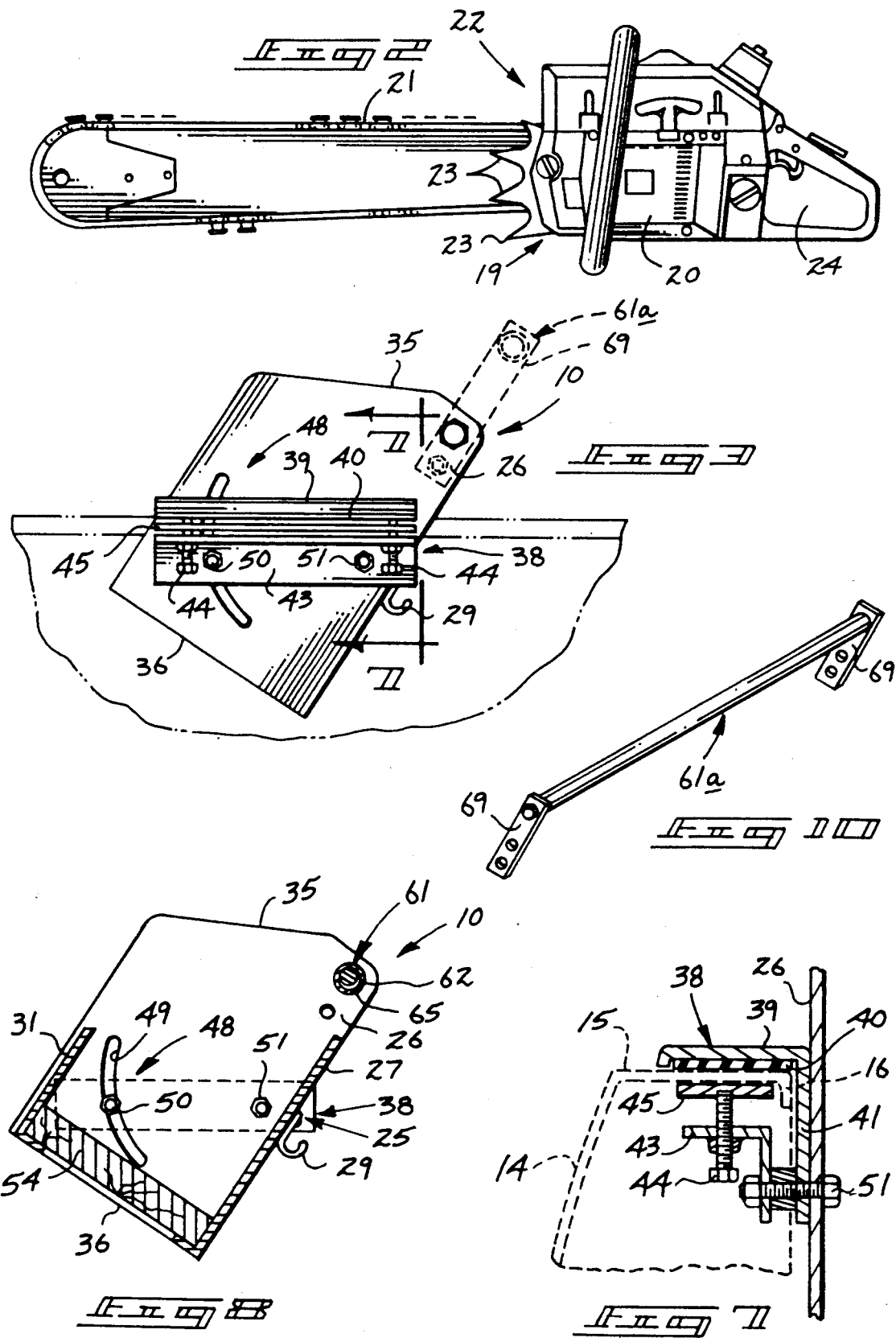

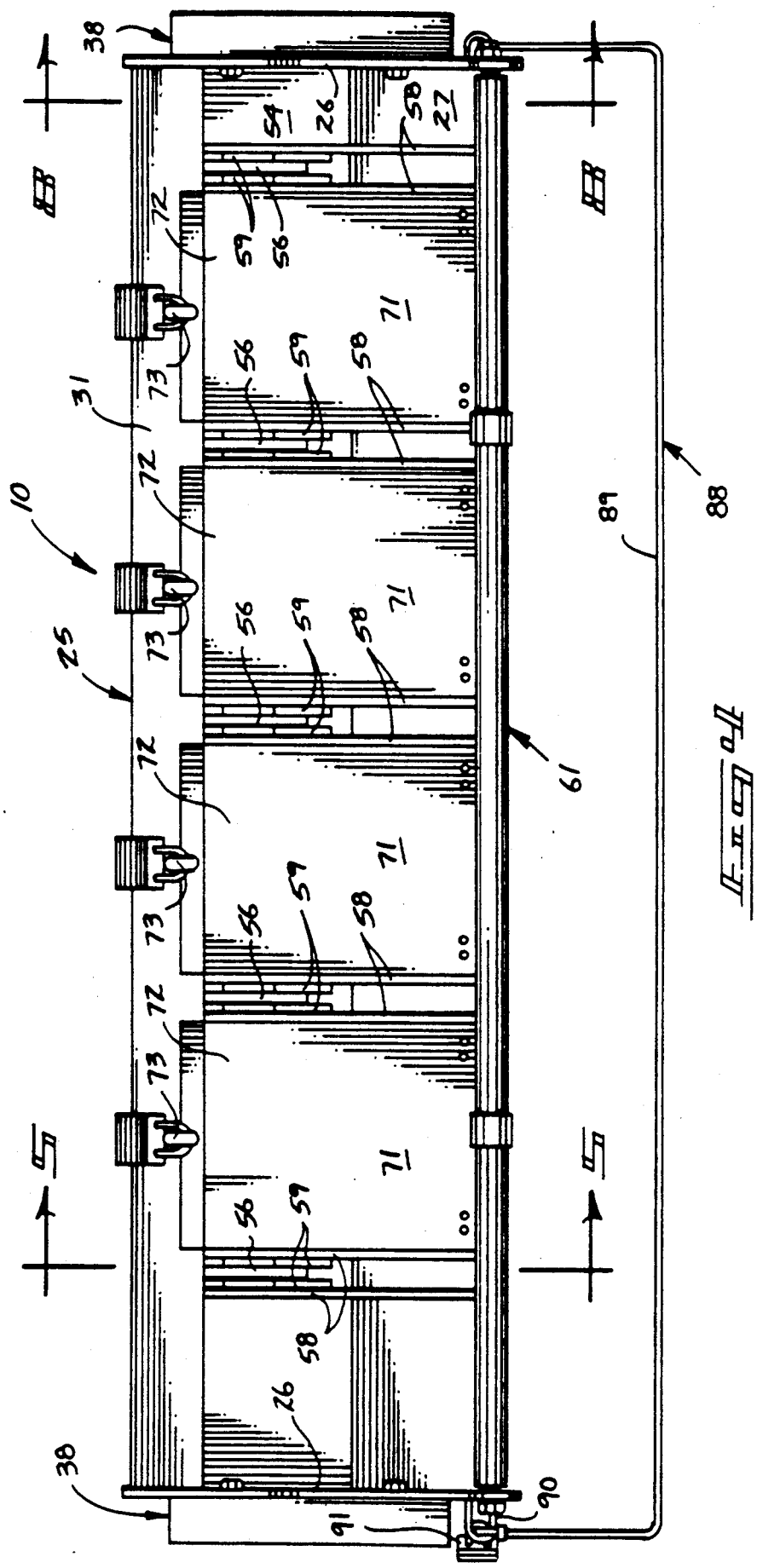

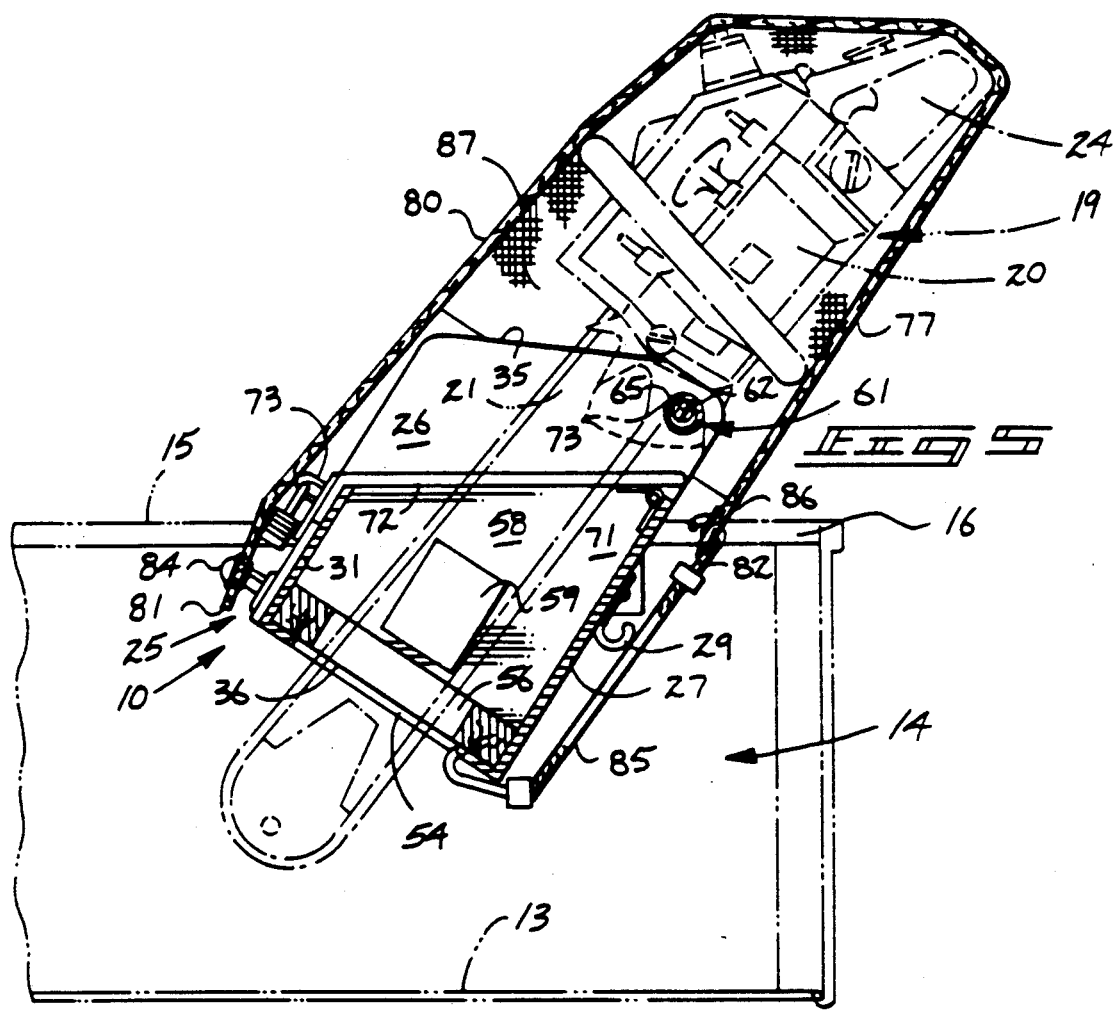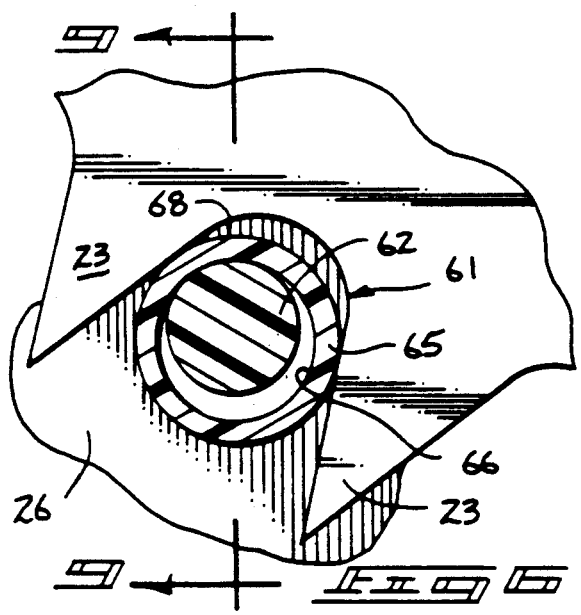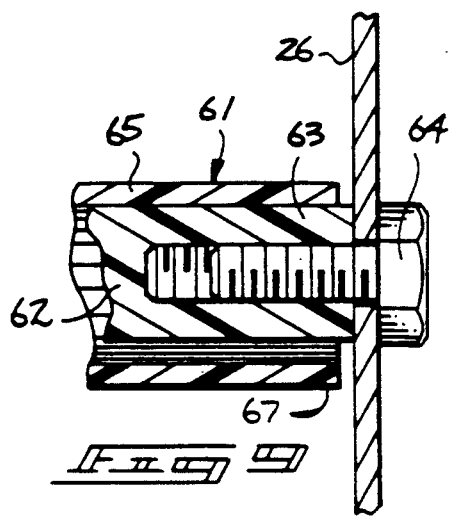

TRUCK SIDEWALL MOUNTED CHAIN SAW CARRIER

TECHNICAL FIELD

The present invention relates to vehicle mounted chain saw carriers.

BACKGROUND OF THE INVENTION

Woodsmen often carry more than one chain saw to logging sites. The typical vehicle used for such transport is a pickup truck. Often, the saws are kept loosely in the back of the pickup truck. The bumpy roads that often lead to the work site cause the vehicle to bounce and the saws to be jostled in the truck bed. This can result in damage to the saws and to any other equipment that might come into contact with the sharp blades.

Carrying cases for chain saws have been developed but are not practical as they add significant bulk to the bed area of the pickup and do not facilitate convenient access to the saw.

As a proposed solution to the above problem, U.S. Pat. No. 4,473,176 to Harper discloses a chain saw security mounting device. This device is comprised of a rigid metal frame that is to be secured to the floor of a pickup or truck bed. The rigid metal frame accepts the engine compartment of a saw with a handle receiving channel at one end of the frame, and a bracket for receiving the blade at an opposite frame end. A locking device is provided on the bracket to secure the saw in place.

While the Harper device may be practical for single saws, it is not convenient for use with multiple saws. Further, the mounting provisions make the Harper device a substantially permanent attachment to the bed of the truck. This is inconvenient when the truck bed is to be used for carrying items other than the chain saw. Furthermore, the configuration of the bracket is such that the device may not be appropriate for a wide variety of saw brands.

Another solution is attempted as disclosed in U.S. Pat. No. 4,846,385 to Fratus. This patent discloses a lockable mounting bracket for chain saws. Essentially, the device is a "scabbard" that is attached by screws or bolts to the outer surface of the tailgate of a pickup truck. A slot is provided along the scabbard frame for receiving a chain saw blade. The device is oriented in an upright manner to receive the saw blade. A locking device is provided to secure the saw in place.

The structure shown in Fratus, like the Harper apparatus, becomes substantially a permanent part of the truck once installed. Furthermore, a single scabbard will receive only a single saw. Thus, if multiple saws are to be carried, a like number of scabbards must be provided and attached to the truck.

In Fratus, the nature of the scabbard is such as to severely limit the style of saw to be used. Many saws include a "wrap-around" forward grip. Clearance for such handles is required on all sides of the engine case except the bottom or base. As the Fratus scabbard mounts flush to a vertical surface, no provision is made for the forward grips of a number of variety of saws.

A need has therefor remained for a chain saw carrier that has the capability of being easily attached and detached from pickup truck beds. There is a further need for such a carrier that will mount to the sidewalls of the truck bed to thereby free the bed surface for carrying other items. It is also desirable to obtain such a carrier that has the capability of receiving and supporting a number of chain saws. It is still further desirable to obtain a chain saw carrier that includes provisions for securing and covering chain saws carried thereon against theft and the outside environment. A still further need is recognized for carriers in which accessories may be carried as well. A yet further need exists for such a carrier that will adjust to accommodate saws having cutting bars of varying length.

The above needs are fulfilled by the present invention which will be more fully disclosed below.

BRIEF DESCRIPTION OF THE DRAWINGS

The preferred embodiment of the invention is illustrated in the accompanying drawings, in which:

FIG. 1 is a diagrammatic view illustrating a pickup truck with the present carrier installed thereon;

FIG. 2 is a diagrammatic view of a chain saw;

FIG. 3 is an end view of the present carrier;

FIG. 4 is a top plan view thereof;

FIG. 5 is an enlarged sectional view taken along line 5—5 in FIG. 4;

FIG. 6 is an enlarged fragmented sectional view illustrating the fit between saw dogs and the saw dog receiving bar of the present invention;

FIG. 7 is an enlarged sectional view taken along line 7—7 in FIG. 3;

FIG. 8 is an enlarged sectional view taken substantially along line 8—8 in FIG. 4;

FIG. 9 is a fragmented sectional view taken substantially along line 9—9 in FIG.; and FIG. 10 is a perspective view of an alternate saw dog receiving bar for saws with long cutting bars.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

The present chain saw carrier is referred to in the drawings by the reference numeral 10. The preferred carrier 10 is mountable to a truck 12 (FIG. 1). As shown, the truck 12 includes a bed 13 and opposed longitudinal sidewalls 14. The sidewalls 14 extend to a horizontal top 15. A flange 16 (FIG. 7) is provided at an inward edge of the sidewall top.

The present carrier 10 is mountable to the truck 12 between the sidewalls 14 and at the sidewall top 15. Mounting devices (described in detail below) are provided to secure the carrier 10 in position across the truck bed as shown in FIG. 1. The mounting arrangement also facilitates selective positioning of the device along the length of the truck bed, and ease in mounting and dismounting of the device to and from the truck.

The present carrier 10 is provided for releasably receiving and supporting one or more chain saws 19. (FIGS. 1, 2). The chain saws exemplified are typical of most modern motorized chain saws. The typical chain saw includes an engine case 20 with an elongated blade 21 extending forwardly from the case. The blade 21 includes a rigid flat bar and a saw chain 22.

A set of saw dog points 23 (FIGS. 1, 2, 6) are typically provided on the engine case 20 at the base of the blade 21. The saw dog points 23 are useful during sawing, for gripping tree trunks to provide leverage points against which the saw is worked to force the blade through its cut. The chain saw also includes a handle enclosure 24 defined in part by a hand grip and a protective guard.

Details of the preferred saw carrier 10 are shown in the drawings in FIGS. 3-9. As shown in FIG. 4 the preferred saw carrier 10 includes an elongated frame 25. The frame 25 extends between opposed, upright end plates 26. Cross members 27, 31 span the distance between the end plates 26 and the truck bed width as shown in FIG. 1. The cross member 27 is located on a back side of the frame. Hooks 29 (FIGS. 3, 5) are mounted to the cross member 27 to receive and suspend a tool belt (not shown) or other accessories for each saw mounted on the carrier. Cross member 31 is provided on the front side of the frame. The cross members 27, 31 are preferably rigid metal plates and may be secured by welding to the end plates 26.

The frame as shown in cross section is FIG. 5, extends elevationally between a top edge 35 and a bottom edge 36. When fitted to the truck, the top edge 35 projects above the sidewall top 15, and the bottom edge extends below.

Truck mounting brackets 38 are secured between the edges 35, 36, to releasably mount the carrier to the truck. The truck mounting brackets are shown in detail in FIGS. 3 and 7. The brackets 38 facilitate quick and easy mounting and dismounting of the carrier to the pickup sidewall top 15. Brackets 38 each include a top sidewall engaging bracket flange 39. Bracket flange 39 includes a padded underside 40. A downwardly extending bracket section 41 is secured to the adjacent end plate 26.

The mounting brackets 38 also include clamp bases 43. The clamp bases are secured to the vertical bracket sections 41 and are spaced slightly outward thereof to provide room to receive the sidewall top 15 and flange 16 of the truck sidewall 14 (dashed lines FIG. 7).

Each of the bases 43 threadably mounts clamp bolts 44. The bolts 44 extend upwardly with upper ends mounting a clamp plate 45. Bolts 44 may be turned to move the clamp plate 45 upwardly, thereby securely clamping the sidewall top 15 between the plate 45 and the padded underside 40 of the sidewall top engaging bracket flange 39.

The bolts 44 and associated clamp arrangements facilitate simple attachment and removal of the carrier 10 to the truck 12 without altering the configuration of the truck in any manner and without damaging or marring the painted surfaces of the sidewall.

An adjustment means 48 (FIGS. 3 and 8) is provided for each of the end plates 26. The adjustment means 48 is situated between the truck mounting brackets 38 and the end plates 26 to facilitate angular adjustment of the carrier 10 in relation to the truck bed 13. Such adjustment may become desirable when chain saws 19, having different length blades 21, are to be carried, to avoid contact between the blade ends and the truck bed 13.

The adjustment means 48 advantageously includes an arcuate slot 49 formed through each of the end plates 26. The slots 49 each receive a clamp bolt 50 (FIG. 8) that extends through the slot and threadably engages an associated mounting bracket 38 on the other side of the adjacent end plate 26. The arcuate slots 49 are provided on radii from pivot bolts 51. The pivot bolts 51 are mounted to the truck mounting brackets 38 and extend outwardly to pivotally support the end plates 26. Pivot bolts 51 thus provide an assembly pivot axis. Adjustment is accomplished simply by loosening the pivot bolts 51, clamp bolts 50, and selectively adjusting the carrier to a desired angle. Clamp bolts 50, and pivot bolts 51 are then tightened to secure the carrier in its selected angular orientation.

A blade receiver, preferably formed as a slotted blade receiving plate 54 (FIGS. 4, 5, 8) extends across the frame between the end plates 26. It is advantageously mounted at ends thereof to the bottom edges 36 of the plates. At least one and preferably several slots 56 are provided in the blade receiving plate 54. The slots 56 are formed to loosely receive the cutting blades 21 of chain saws. It is preferred that the plate 54, or at least those areas of the plate bounding the slots 56, be formed of wood in order to prevent damage or dulling of the saw blades upon insertion and removal of the saws.

Guides 58 are provided on opposite sides of the individual slots 56. Pairs of the guides 58 join the front and rear cross members 31, 27 of the frame on opposite sides of each blade receiving slot 56. Each guide includes a rub plate 59 (FIGS. 4, 5) that may be formed of a low friction material such as plastic facing the adjacent slot 56 to aid in guiding the saw blade through the slot 56 and to hold the saw against rocking motion when mounted to the carrier. The rub plates 59 are preferably positioned to engage opposite sides of the bar portion of the blade 21 as shown in FIG. 4.

A saw dog receiving bar 61 (FIGS. 1, 4, 5, 8, 9) is situated above the blade receiving plate 54. The saw dog receiving bar is preferably comprised of an elongated rigid rod 62. The rod 62 includes opposed threaded ends 63 (FIG. 9) that are secured by bolts 64 to the end plates 26.

A tubular sleeve 65 is loosely received over the rod 62. The sleeve 65 includes an internal sleeve bore 66 (FIG. 6) that is slightly larger in diameter than the central rigid rod 62. The sleeve 65 extends between ends 67 (FIG. 9) that are spaced apart by a distance slightly less than the distance between end plates 26. The sleeve is therefore relatively free to slide and rotate on the rod 62.

Sleeve 65 also includes an external circumference 68 of a diameter that is sufficient to allow the sleeve to be received between adjacent saw dog points 23 of a chain saw 19 (FIG. 6). The sleeve 65 may therefore be wedged between the adjacent points 23 to support a saw in a relatively upright orientation with the blade extending downwardly through the associated slot 56 in the blade receiving plate 54 as shown by dashed lines in FIG. 5.

The weight of the saw bears downwardly, wedging the sleeve between adjacent saw dog points 23, while the blade 21 is received within the slot 56 below to hold the saw from moving along the length of the bar 61. The saw is thus secured for transport, yet is easily accessible to the user.

It is preferred that the sleeve 65 be formed of a material such as plastic (polyvinyl chloride, ABS, or other appropriate, durable plastic material). Such material will not dull saw blades on insertion and removal, and will not easily wear due to the nature of the material and the loose, rolling relationship of the sleeve over the elongated rod 62. Furthermore, the sleeve 65 may be easily removed and replaced should excessive wear eventually occur.

An extension saw dog receiving bar 61a is shown in FIG. 10 and in dashed lines in FIG. 3. The extension bar is used to replace the bar 61 when saws having unusually long cutting bars are to be carried. The extension bar 61a includes end extension brackets 69 at opposed ends of an alternate blade receiving rod and sleeve, that can simply be bolted to the end plates 26, replacing the existing bar 61. Other than the brackets 69, the bar 61a is substantially identical to the bar 61 described above.

As shown in FIG. 4, a number of tool compartments 71 are provided along the length of the carrier. A tool compartment 71 may be provided between each set of the guides 58 as shown. Each tool compartment 71 includes the guide 58 as end walls, the cross members 27, 31 as side walls, the blade receiving plate 54 as a bottom wall.

Lids 72 are hinged on one of the cross members 27 or 31 as shown in FIG. 5. Lock hasps 73 may be provided to facilitate locking of the compartments 71 by conventional locks such as combination, padlocks, etc.

Saws 19 carried by the present carrier 10 may be selectively covered for security and against rain, snow, dust, etc. by a cover member 77 (FIG. 5). The cover member is shown in end view in FIG. 5. It includes a flexible sheet that preferably spans the entire length of the carrier and overlaps the end plates 26. It includes a first edge 81, and a second edge 82. The distance between edges 81 and 82 is sufficient to allow the sheet 80 to be formed over the engine cases of saws mounted on the carrier 10.

The flexible sheet 80 and carrier frame 25 include first fasteners 84 for securing the first sheet edge 81 to the carrier. The first fasteners may be provided in the form of conventional snaps that will releasably secure the edge 81 to the frame. Second fasteners 85 may be provided in the form of elastic straps with opposed hooks ("bungee" cords) that may be secured through appropriate grommets 86 on the sheet and surfaces of the carrier frame 25.

The elastic second fasteners 85 facilitate securing of the sheet 80 over saws with different size and configuration engine cases 20. The flexible sheet 80 and elastic fasteners 85 will flex and stretch to conform firmly about the cases 20 regardless of their shapes or sizes.

The sheet may have end surfaces or flaps, one of which is shown at 87 in FIG. 5. The flaps cover the sides of saw engine cases 20 adjacent the end plates 26 of the frame.

A lock means 88 is shown in FIG. 4. Lock means 88 is utilized for securing the chain saws to the frame 25 to thereby avoid theft or unauthorized removal of a saw or saws from the carrier 10. The lock means is preferably comprised of an elongated flexible member 89 having one end attached to the frame and a remote end extendable through the handle enclosures 24 of the saw or saws (FIG. 1) carried along the frame 26.

The flexible member may be provided as a woven wire cable, chain, or other appropriate strong yet flexible member. The remote end of the flexible member and the associated end plate 26 of the frame include lock fittings 90. Such fittings 90 may be in the form of a hasp on the end plate and a loop at the end of the flexible member 89. Other conventional lock fittings may also be used.

The fittings 90 may be secured together and fastened by means of a padlock 91 or other appropriate locking device. Once the flexible member 89 is secured through the handle enclosures 24, the saws become secured to the carrier 10 and are thereby secured against theft or other unauthorized removal.

It is emphasized that the present carrier is supplied to mount one or more saws. In fact, the carrier shown in the drawings will mount five chain saws (see FIG. 1). With addition of a second saw dog receiving bar and additional slots (not shown), as many as, say, ten saws may be mounted to the carrier. The number of saws is limited only by the dimension of the engine cases 20 and the width of the truck bed 13 between sidewalls 14.

Installation of the present carrier is accomplished as briefly indicated above, simply by positioning the device between opposed sidewalls 14 of the truck 12 and securing the mounting brackets 38.

The truck mounting brackets are secured to the top 15 of the truck sidewall by the clamp arrangement shown in FIG. 7 and described above. This procedure is accomplished simply by positioning the bracket flanges 39 over the sidewall top surfaces 15 and the clamp plates 45 under the top surfaces 15. The padded underside 40 on the flanges assure no damage will be done to the adjacent painted surfaces.

Next the bolts 44 are turned to bring the clamp plates 45 up firmly against the under surface of the sidewall top surfaces 15. The sidewall top is therefore secured firmly between the clamp plates 45 and the padded undersides 40 of the top sidewall engaging bracket flanges 39. The carrier may be as easily removed from the truck simply by reversing the mounting procedure.

Once mounted to the truck, the carrier is ready for use.

A saw may be installed on the carrier simply by inserting its blade 21 downwardly through an appropriate slot 56 of the blade receiving plate 54. The saw is guided downwardly until the saw dog receiving bar 61 is received between the saw dog points 23. The blade receiving plate 54 and saw dog receiving bar 61 bear the weight of the saw and secure it for transport with the blade 21 upwardly clear of the truck bed 13. This avoids damage to the saw and damage to other materials within the truck bed by the saw blade. The carrier 10, suspending the saw above the truck bed 13 frees the bed surface for other uses.

The weight of the saws and the saw dog points 23 bearing against the sleeve 65 secure the saws in position. The saw dog receiving bar sleeve 65 is received and held between adjacent saw dog points 23 (FIG. 6) and the blade is held securely in the slot 56. This mounting geometry will assure that the saws will not become dislodged from the carrier even when transported over rough terrain.

Removal of a saw is accomplished simply by grasping the handle and pulling the saw upwardly. There is no need to take extra precaution against scuffing the blade against the carrier as the blade receiving plate 54 is preferably formed of wood to avoid dulling the blade, and the sleeve 65 is formed of plastic for the same purpose. Thus, the saw may be quickly and easily removed for use.

If desired, the lock means 88 may be employed to physically lock the saws to the carrier 10. The free end of the flexible member 89 is simply threaded through the saw handle enclosure 24 of each saw desired to be locked. The free end is then secured by the lock fittings 90 and a lock is attached. This simple procedure secures the saw or saws to the carrier and thereby effectively deters theft. The saws may be unlocked simply by reversing the locking procedures.

The cover member 77 may be employed should inclement or dusty weather conditions be observed. This is accomplished simply by snapping the first fasteners 84 together to secure the first edge 81 of the sheet to the frame 25. The cover 77 is then draped over the saw engine cases 20 presently mounted on the carrier 10. The elastic fasteners 85 are then secured on the opposite side of the frame.

The resiliency of the elastic fasteners will serve to hold the cover firmly over the saw compartments while the sheet material covers and encloses the compartments against dust and adverse weather.

The hooks 29 are provided along the carrier for use in securing loose accessories such as saw belts which may be hung from the hooks 29. Sharpening tools, scaling measures, etc. may be carried and locked in the tool compartments 71.

Selective angular adjustment of the frame 25 may be made to accommodate saws 19 having excessively long saw blades. This is done to avoid contact between the end of the saw blades 21 with the bed 13 of the truck 12. Adjustment is made as indicated above by selectively: (a) loosening, the bolts 50, 51, (b) pivoting the frame 25 on the axis of bolt 51 to an appropriate selected angle in relation to the bed of the truck, and (c) retightening the bolts 50 and 51.

Use of the adjustment facilitates angular positioning of the frame to correspondingly change the angular orientation of the saw blade with respect to the bed or floor surface of the truck. Long saw blades may require that the frame be tilted to a shallow angular position, while short blades may allow the frame to be positioned in a substantially upright position. However, the range of movement is such that the device may not be oriented in a horizontal condition.

The saws will always be inclined such that the weight of the saws will rest against the saw dog receiving bar 61 and the saw weight will be carried by the bar 61. It is important that this relationship be maintained in order that the carrier adequately support saws against unintentional dislodging as bumpy roadways are encountered.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A truck mountable chain saw carrier, for releasably securing and supporting a chain saw in a substantially upright condition, with the chain saw having a handle enclosure, an elongated blade extending downwardly from an engine case and a plurality of saw dog points on the engine case adjacent the blade, the carrier comprising:

an elongated frame;
the frame including opposed frame ends;
upstanding frame end plates adjacent the frame ends;
the end plates including base ends and top ends;
a saw dog receiving bar extending between the end plates and having a cross sectional dimension sufficient for the saw dog bar to be received between adjacent ones of the plurality of saw dog points for supporting the saw with the blade extending downwardly therefrom;
a blade receiver spaced toward the base ends of the end plates downwardly from the saw dog receiving bar for releasably receiving the saw blade with the saw dog receiving bar received between saw dog points on the saw; and
truck mounting brackets on the frame for attaching the frame to a truck with the saw dog receiving bar and the blade receiver oriented such that a saw mounted to the carrier is supported in a substantially upright orientation by the saw dog receiving bar and with the blade projecting downwardly to the receiver.

2. The truck mountable chain saw carrier of claim 1 further comprising an adjustment means on each of the end plates for angularly adjusting the saw dog bar and blade receiver in relation to the truck mounting brackets.

3. The truck mountable chain saw carrier of claim 1 wherein the blade receiver is a plate formed of wood and having a blade receiving slot formed through the plate.

4. The truck mountable chain saw carrier of claim 1 further comprising a cover member releasably mounted on the frame to at least partially enclose the saw dog bar and the blade receiver and having sufficient dimension to cover the engine case of a saw mounted to the saw dog bar and blade receiver.

5. The truck mountable chain saw carrier of claim 4 wherein the cover member is comprised of:
a flexible sheet;
the flexible sheet including opposed edges;
first fasteners on one edge of the sheet for attachment to the frame; and
second fasteners on the remaining edge of the sheet for selective attachment to the frame with the sheet extending from the one edge over the engine case of a saw mounted to the saw dog and blade receiver.

6. The truck mountable chain saw carrier of claim 1 further comprising a lock means mounted to the frame and attachable to the saw to lock the saw to the frame.

7. The truck mountable chain saw carrier as claimed by claim 6 wherein the lock means is comprised of:
a flexible member;
the flexible member having one end attached to the frame;
the flexible member having a remote end extendable through the handle enclosure of the chain saw; and
interfitting lock fittings on the remote end of the flexible member and on the frame.

8. The truck mountable chain saw carrier of claim 1 wherein the saw dog receiving bar is comprised of:
a rigid elongated rod mounted to the end plates; and
a sleeve loosely mounted over the rod and freely rotatable thereon, the sleeve extending along the length of the rod for engagement between adjacent ones of the saw dog points of the chain saw.

9. The truck mountable chain saw carrier of claim 8 wherein the sleeve is formed of a plastic material.

10. A truck mountable chain saw carrier, for releasably securing and supporting at least one chain saw having an elongated blade extending from an engine case with a handle enclosure at one end of the engine case and saw dog points on the engine case adjacent the blade and opposite the handle enclosure, the carrier comprising:
an elongated frame;
a saw dog receiving bar connected to the frame;

the saw dog receiving bar having a cross sectional dimension sufficient to be received between adjacent ones of the saw dog points;

a blade receiver connected to the frame from the saw dog receiving bar;

at least one saw blade receiving slot formed in the blade receiver and oriented substantially perpendicularly to the saw dog bar for releasably receiving a like number of chain saws with adjacent ones of the saw dog points engaging the saw dog receiving bar; and means on the frame for attaching the frame to the truck with the saw dog receiving bar and the blade receiver oriented such that a saw mounted to the saw dog receiving bar with its blade extending through the slot in the blade receiver is supported in a substantially upright orientation with the blade projecting downwardly.

11. The carrier of claim 10 further comprising:

end plates on the frame, mounting the saw dog receiving bar to the frame; and an adjustment means on each of the end plates, for angularly positioning the saw dog bar and blade receiver in relation to the truck.

12. The carrier of claim 10 wherein the blade receiver is formed of a wood plate and the saw blade receiving slot is formed through the plate.

13. The carrier of claim 10 further comprising a cover member releasably mounted on the frame to at least partially enclose the saw dog bar and the blade receiver and having sufficient dimension to cover the engine case of a saw mounted to the saw dog bar and blade receiver.

14. The carrier of claim 13 wherein the cover member is comprised of:

a flexible sheet;

the sheet having one edge thereof attached to the frame;

the sheet having a remaining free edge;

fasteners on the sheet free edge and on the frame spaced from the one edge for selective attachment to the frame with the sheet extending from the one edge over the engine case of a saw mounted to the saw dog and blade receiver.

15. The carrier of claim 10 further comprising a lock means mounted to the frame and attachable to the saw to lock the saw to the frame.

16. The carrier as claimed by claim 10 further comprising a lock means, including:

a flexible member;

the flexible member having one end affixed to the frame;

the flexible member further including a remote end extendable through the handle enclosure of the saw; and interfitting lock brackets on the remote end of the flexible member and on the frame, to be secured together with the flexible member extending through the handle enclosure of the chain saw.

17. The carrier of claim 10 wherein the saw dog receiving bar is comprised of:

a rigid central rod connected to the frame; and a sleeve mounted over the rod and freely rotatable thereon, the sleeve extending along the length of the rod for engagement by the blade and saw dog of a chain saw.

18. The carrier of claim 17 wherein the sleeve is formed of a plastic material.

19. The truck mountable chain saw carrier of claim 17 wherein the sleeve is formed of a plastic material and is tubular with an external circumference sized to be wedged between adjacent ones of the saw dog points of a chain saw.

20. The truck mountable chain saw carrier of claim 10 further comprising:

a lidded compartment on the frame between the blade receiver and the saw dog receiving bar;

the lidded compartment including at least one end wall forming a guide for the saw blade adjacent the saw blade receiving slot.

21. The truck mountable chain saw carrier of claim 10 further comprising hanger hooks on the frame.

22. A truck mountable chain saw carrier, for releasably securing and supporting a chain saw having an elongated blade extending from an engine case and saw dog points on the engine case adjacent the blade, the carrier comprising:

an elongated frame;

the frame including opposed frame ends;

upstanding frame end plates adjacent the frame ends;

the frame end plates including base ends and top ends;

a saw dog receiving bar extending between the end plates and having a cross sectional dimension sufficient for the saw dog bar to be received between adjacent ones of the saw dog points;

a blade receiving plate extending between the end plates and spaced toward the base ends of the end plates from the saw dog receiving bar;

saw blade receiving slot formed in the blade receiving plate and oriented substantially perpendicularly to the saw dog bar for releasably receiving the saw blade with the adjacent ones of the saw dogs and the blade engaging the saw dog receiving bar;

an adjustment bracket on each of the end plates adjustable to angularly position the saw dog bar and blade receiving plate;

a cover member releasably mounted on the frame to at least partially enclose the saw dog bar and the blade receiving plate and having sufficient dimension to cover the engine case of a saw mounted to the saw dog bar and blade receiving plate;

a lock means mounted to the frame and attachable to the saw to lock the saw to the frame; and truck mounting brackets on the frame for attaching the frame to a truck with the saw dog receiving bar and the blade receiving plate oriented such that a saw mounted to the carrier is supported in a substantially upright orientation by the saw dog receiving bar and with the blade projecting downwardly through the blade receiving slot.

23. The truck mountable chain saw carrier of claim 22 wherein the saw dog receiving bar is comprised of:

a rigid central rod mounted to the end plates; and a sleeve mounted over the rod and freely rotatable thereon, the sleeve extending along the length of the rod for engagement between adjacent ones of the saw dog points of a chain saw.

24. The truck mountable chain saw carrier of claim 23 wherein the sleeve is formed of a plastic material and is tubular with an external circumference sized to be wedged between adjacent ones of the saw dog points of a chain saw.

25. The truck mountable chain saw carrier of claim 22 further comprising a lidded compartment on the frame between the blade receiving plate and the saw dog receiving bar.

26. The truck mountable chain saw carrier of claim 22, further comprising:
- a forward edge on the blade receiving plate;
- a rearward edge on the blade receiving plate;
- and further comprising hanger hooks on the frame along the rearward edge of the blade receiving plate.

27. A vehicle mountable chain saw carrier for releasably mounting at least one chain saw having a blade extending from an engine housing and saw dog points adjacent to the blade, the carrier, comprising:
- an elongated frame;
- the frame including opposed frame ends;
- a saw dog receiving bar on the frame and having a cross sectional dimension sufficient for the saw dog bar to be received between adjacent ones of the saw dog points for supporting the saw with the blade extending downwardly therefrom;
- a blade receiver on the frame adjacent the saw dog receiving bar for releasably receiving the saw blade with the saw dog receiving bar received between adjacent ones of the saw dog points on the saw; and
- vehicle mounting brackets on the frame for attaching the frame to a vehicle with the saw dog receiving bar and the blade receiver oriented such that a saw mounted to the carrier is supported in a substantially upright orientation by the saw dog receiving bar and with the blade received by the blade receiver.

28. The vehicle mounted chain saw carrier of claim 27, further comprising:
- an extension mountable between the saw dog receiving bar and elongated frame to selectively space the saw dog receiving bar from the blade receiver.

* * * * *